Feb. 28, 1967 H. DERSIN ETAL 3,306,703

METHOD FOR THE PRODUCTION OF SEMICONDUCTOR DENDRITES

Filed Aug. 13, 1962

United States Patent Office 3,306,703
Patented Feb. 28, 1967

3,306,703

METHOD FOR THE PRODUCTION OF SEMICONDUCTOR DENDRITES

Hansjürgen Dersin, Ottobrunn, near Munich, and Erhard Sirtl, Munich, Germany, assignors to Siemens & Halske Aktiengesellschaft, Berlin, Germany, a German corporation Filed Aug. 13 1962, Ser. No. 216,501
Claims priority, application Germany, Aug. 14, 1961, S 75,288
3 Claims. (Cl. 23—204)

Our invention relates to the production of semi-conductor dendrites. In the semiconductor art, ribbon-or band-shaped semiconductor dendrites, that is semiconductor monocrystals grown with twin planes, are often desired. In the production of such semiconductor crystals, the usual procedure consists in drawing the dendrite by means of a seed crystal from a supercooled semiconductor melt. When it is desired to form dendrites, in this way, from semiconductors which consist not of one element but rather of a chemical compound, for example of an $A^{III}B^{V}$ compound, such as gallium arsenide (GaAs), gallium phosphide (GaP), indium antimonide (InSb) or similar materials, serious difficulties are often encountered. Since the elements of which the semiconductor compound consists, at the high melting temperatures, often have considerable partial-pressure differences, it is necessary to compensate exactly the considerable decomposition pressure caused by these differences during the melting process so that the stoichiometry of the compound is still guaranteed in the final crystal.

Of course, as is known, these difficulties do not occur when gallium arsenide is isolated crystallinely from a reaction gas or vapor on the cooled wall of the reaction vessel. The chemical reactions for this have already been investigated and are known; they proceed according to the formula $$2(GaAs)+(GaI_3)\rightleftarrows 3(GaI)+(As_2)$$

(cf. the publication of Antel and Effer in J. Electr. Chem. Soc., vol. 106 (1959), page 509 and German published patent application 1,049,886) in which the equilibrium is displaced to the right with rising temperature and to the left with falling temperature and the resulting isolation of solid GaAs. There are corresponding reactions for other semiconductor materials, in which reactions, cooling an equilibrium gas mixture results in obtaining the semiconductor material in solid form. With the above-mentioned example of gallium arsenide, the temperature of the gas mixture consisting of $GaI_3$, GaI and $As_2$ is lowered, for example by cooling a portion of the reaction-vessel wall, thereby causing gallium arsenide to precipitate and detach itself from the cold vessel-wall portion. These experiments, however, did not lead to the formation of band-shaped dendrites, thereby making the procedure seem unsuitable for the production of such dendrites.

It is an object of this invention to prepare semiconductors with high melting temperatures, such as germanium, silicon and particularly of $A^{III}B^{V}$ compounds from gaseous or vapor phase band-shaped dendrites. It is a further object to indicate the conditions necessary to accomplish the above result. More particularly in accordance with our invention, it is essential to observe the following conditions: First, the reaction gas mixture in which the desired substance is to be precipitated in solid form upon cooling, must be intensely supercooled throughout the duration of desired denritic growth. Furthermore, to initiate the dendritic growth, the intensely supercooled state must be brought about relatively quickly. Finally, in order to obtain a relatively long and sufficiently wide dendritic ribbon at least 1 or several cm. long, and at least 5 mm. wide, it is very important to maintain, during the dendritic growth, the highest possible temperatures, that is, to have a steep temperature and concentration gradient in the reaction vessel.

The importance of the measures of this invention will now be further explained on the basis of the above-mentioned equilibrium reaction and with reference to the figures in which:

FIG. 1 discloses the temperature characteristics of a furnace and the reaction vessel therein;

It is understood of course that the invention is not to be limited to the above reaction alone and, for example, bromine may be used in lieu of the iodine of the specific example.

Figure 1:
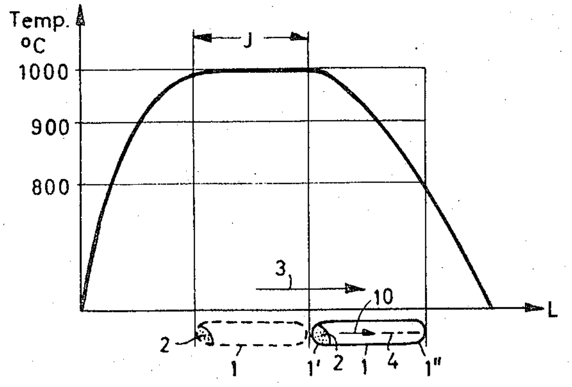

By suitably heating a furnace of length L, a temperature curve corresponding to that shown in FIG. 1 is obtained in the furnace. As can be seen, the temperature rises from both ends of the furnace toward the middle of about 1000° C. and is approximately constant in the inner region J of the furnace. On both sides of the inner region J, the temperature curve, however, descends relatively steeply. Before initiating the dendritic growth, reaction vessel 1 is located in the dotted-line position within the furnace so that it, the reaction vessel, is uniformly heated to about 1000° C. A supply 2 of gallium arsenide, preferably in powdered form, is located within the vessel whose walls consist preferably of quartz. Enough iodine is also present in the reaction vessel 1 so that at the temperature of the inner region J of the furnace, and hence at about 1000° C., an equilibrium is established in the vessel through reaction of as much iodine as possible with the semiconductor supply 2. The gas mixture consisting of $GaI_3$, 3GaI and $As_2$ which forms according to the above-mentioned reaction equation from the solid gallium arsenide supply 2, consumes only a portion of the gallium arsenide supply. After attaining the equilibrium of the gas corresponding to the inner temperature of the furnace (about 1000° C.), therefore, there is, according to our invention, a supply of gallium arsenide 2 present. This gallium arsenide supply serves during the growth of the dendrite to furnish semiconductor material according to the reaction equation for the formation of the reaction components. After the equilibrium in the reaction gas corresponding to the inner temperature of the furnace of about 1000° C. in the dotted-line position is shown on the drawing of FIG. 1, the reaction vessel 1 which, for example, is tubular, is displaced in the direction of the arrow 3 into the solid-line position within the furnace. The supply 2 which is present at one end 1' of the reaction vessel 1 is, therefore, still maintained at a high temperature of about 1000° C. while the temperature at the other end 1'' of the reaction vessel is considerably lower and is shown in FIG. 1 to be about 800° C. Consequently, the vessel wall 1' is so intensely cooled that the gas which is present in an equilibrium corresponding to much higher temperature (1000° C.) is intensely supercooled at the vessel-wall portion. The previous equilibrium is greatly disturbed. As a result thereof, the semiconductor material precipitates and since the supercooling is sufficiently great and corresponds at least to 100° C., the dendrites now begin to grow approximately perpendicular to the wall into the interior of the vessel. Through the rapidity with which this intensive cooling is brought about (in the instant example about 200° C.), the quantity of the precipitated gallium arsenide increases so rapidly that sufficient semiconductor material is available for dendritic growth. At a suitable location on the vessel wall, which as stated above consists preferably of quartz, a dendrite begins to grow in the desired form. This results, in the example of GaAs, through the rapid consumption of the molecularly occurring gallium arsenide with a steep gas-pressure drop at the location of a dendrite and thereby with a rapid depletion of gallium arsenide in the immediate vicinity of the dendrite.

Were this supercooling, which is necessary for delivering the semiconductor material from the gas in a sufficient quantity for dendritic growth, brought about slowly, that is, if the reaction vessel 1 were displaced slowly in the direction of the arrow from the dotted-line position to the solid-line position, there would exist the danger of constant precipitation of gallium arsenide on the walls of the vessel during the displacement of the reaction vessel. This quantity of semiconductor material available for precipitation per unit of time would, however, be insufficient for the formation of a dendrite. Moreover, there occurs in the reaction vessel only a relatively small partial-pressure gradient of the reaction partners of the semiconductor so that molecularly precipitating gallium arsenide under the influence of slow cooling, would be insufficient for dendritic growth. This pressure gradient through the above-described two measures of intensive supercooling of at least 100° C. and rapid bringing about of this intense supercooled state, is provided with the necessary velocity to assure the bringing about of a sufficiently intense supercooled state that during the displacement practically no semiconductor material precipitates in the reaction gas mixture or separates out on the wall of the reaction vessel. Thereafter, the dendritic growth commences, see FIG. 1, dotted line 4, and continuous quantities of semiconductor material are delivered to the dendrite for the growth thereof. Consequently, the reaction products of the gas forming the semiconductor, and hence in the case of gallium arsenide, see the above equation, GaI and $As_2$, migrate during the dendritic growth continuously from the supply 2 in the direction of the dendrite 4 (see the arrow 10, FIG. 1) while at the same time a steep partial-pressure gradient occurs in the direction of supply 2 for that reaction partner ($GaI_3$), which together with the supply 2 at the high temperatures at which it is kept, replenishes the reaction partners (GaI, $As_2$) consumed by the formation of the dendrite. Consequently, the semiconductor supply 2 replenishes the reaction gas with the quantity of gallium arsenide consumed in the dendrite formation. Consequently, the steep temperature partial-pressure gradient in the reaction vessel, assisted by the high temperatures of about 1000° K. or higher, assures intense delivery of a semiconductor (gallium arsenide) from the supply 2 to the dendrite 4 and, as long as the steep gradient is maintained, the dendrite growth continues.

Figure 2:
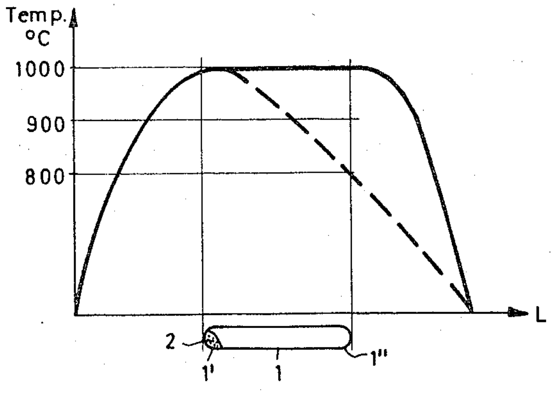
FIG. 2 shows a modification of such a temperature characteristic.

Instead of displacing the reaction vessel 1 in accordance with FIG. 1 relative to the furnace from a region of approximately constant temperature to a region with a steep temperature gradient, it is also possible, as shown in FIG. 2 by a corresponding modification of the furnace, to vary the temperature course rapidly along the furnace. Consequently, the solid-line curve of temperature in dependence on the furnace length L is first maintained in the furnace until there is established in the vessel 1 through the reaction of iodine with the supply 2, the equilibrium corresponding to the temperature of about 1000° C. Afterwards, for example, by blowing in cooled air or similar expedients, there is quickly brought about in the furnace a dotted-line temperature gradient, so that the left end 1′ of the vessel 1 with this supply continues to remain at the high temperature while the right end 1″ of the reaction vessel is cooled at least 100° C. and in the example herein given is brought to a temperature of 800° C. The change of the temperature distribution from the solid-line to the dotted-line course shown in FIG. 2, must, of course, occur quickly in order to produce in the reaction vessel a steep partial-pressure gradient in the gas.

Figure 3:
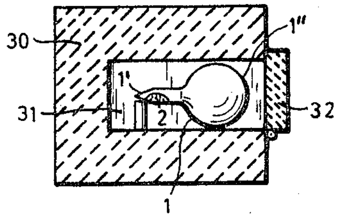
FIG. 3 depicts apparatus for producing the rapid temperature distribution of FIG. 2.

Apparatus for bringing about this rapid temperature distribution in the furnace is shown in FIG. 3. 30 shows a transverse section of the furnace. In the furnace space 31 there is present the reaction vessel 1 which at one end 1″ is shperical and at its other end 1′, containing supply 2 therein, is a considerably smaller cross section. By opening flap 32 of the muffle furnace 30, cold air flows into the furnace area 31 and in this way produces the desired steep temperature gradient along the vessel 1 as is shown in FIG. 2. By cooling end 1″, therefore, we produce the strong supersaturation of the reaction gas in the spherical portion of vessel 1. The spherical form 1″ of the vessel 1 shown in FIG. 3 favors the growth of long dendrites by supercooling. It is important for our invention to cool the gas at the end 1″ of the vessel 1 at which the dendrites are to form on the wall rapidly and intensely, that is, at least 100° C. compared with the temperature of the gas prior to supercooling, and to maintain the opposite end 1′ of the reaction vessel with the semiconductor supply at a temperature considerably higher than that of the dendrite during the growth thereof. In particular, this temperature at the end 1′ with the semiconductor supply may also be even higher than the temperature (1000° C.) which prevailed at the vessel before the end 1″ was cooled. According to a further feature of the invention, the dendrite obtained in this way may be given a precise doping either in that the doping agent is preincorporated into the starting material or that the doping agent is added to the reaction gas in the form of an element or of a corresponding decomposable compound. This addition of doping agent may also occur during the growth of the dendrite, and may even be changed, thereby varying the level and kind of doping in the longitudinal direction of dendrite growth.

The size of the dendrite produced according to the invention varies in dependence upon the reaction conditions, that is, in dependence on the intensity of the supercooling and the steepness of the temperature gradient within the reaction vessel during growth. The dendrites produced according to our invention had lengths up to 10 cm., widths in some case of 5 mm. and a thickness of between 50 to 500$\mu$.

Obviously, many modifications and variations of the present invention are possible related to the above teachings. It is, therefore, to be understood that within the scope of the appended claims, the invention may be practiced otherwise than is specifically described.

We claim:

1. A method of producing a gallium arsenide dendrite which comprises producing an equilibrium reaction gas mixture from gallium arsenide and iodine over a solid supply of gallium arsenide at a temperature above 1000° C., within a reaction vessel, by placing the reaction vessel within an isothermal furnace area, thereafter rapidly and intensely cooling one end of the reaction vessel at least 100° C. by displacing the reaction vessel to an area with a steep temperature gradient and maintaining said one end at this temperature while maintaining the solid supply within the reaction vessel at the equilibrium temperature.

2. A method of producing a gallium arsenide dendrite which comprises producing a state of equilibrium of a reaction gas mixture from gallium arsenide and iodine in the presence of a solid supply of gallium arsenide at a temperature above 1000° C. within a reaction vessel, by placing the reaction vessel within an isothermal furnace area, thereafter rapidly and intensely cooling one end of the reaction vessel from 100° C. to 200° C. by introducing a cooling gas into the furnace and maintaining said one end at this temperature while maintaining the solid supply within the reaction vessel at the equilibrium temperature.

3. A method of producing a gallium arsenide dendrite which comprises heating a reaction vessel, containing a supply of solid gallium arsenide in one end of the reaction vessel and sufficient iodine to form an equilibrium mixture at about 1000° C., to a temperature of about 1000° C., thereafter rapidly cooling the end of the reaction vessel not containing the gallium arsenide supply at least about 100° C. to supercool the equilibrium mixture while maintaining the end containing the gallium arsenide supply at about 1000° C., thereby precipitating gallium arsenide dendrite at the cooled end of the reaction vessel.

References Cited by the Examiner

UNITED STATES PATENTS

| | | | |
|---|---|---|---|
| 2,862,787 | 12/1958 | Seguin et al. | 23—204 |
| 3,145,125 | 8/1964 | Lyons | 23—204 |

OSCAR R. VERTIZ, *Primary Examiner.*

H. S. MILLER, *Assistant Examiner.*